Figure 1:
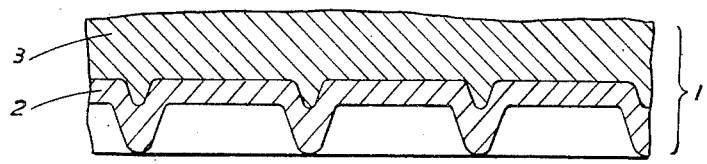

Sept. 1, 1953  H. E. HOLMAN  2,650,900
METHOD OF PRODUCING METAL MESH SCREENS
Filed Nov. 26, 1947

Inventor:
H. E. HOLMAN
by: J. O. Ollier,
atty.

Patented Sept. 1, 1953

2,650,900

UNITED STATES PATENT OFFICE 2,650,900

METHOD OF PRODUCING METAL MESH SCREENS

Herbert Edward Holman, Middlesex, England, assignor to Electric & Musical Industries Limited, Hayes, Middlesex, England, a British company Application November 26, 1947, Serial No. 788,200
In Great Britain November 27, 1946

9 Claims. (Cl. 204—11)

This invention relates to a method of producing metal mesh screens such as are suitable for use in television transmission tubes.

In television transmission tubes a so-called double-sided mosaic screen is sometimes employed, this screen being composed of a metal mesh suitably insulated, the interstices of the mesh being provided with conducting elements, and on to one side of the mosaic screen so formed an image for transmission is projected while the other side is scanned by a cathode ray beam. Metal mesh screens are also employed as stencil meshes which are used, for example, when it is desired to evaporate metal on to a support through the interstices of the mesh so as to form a multiplicity of discrete conducting elements on said support, and they are also frequently employed as control electrodes in television transmission tubes and other electron discharge devices.

In United States patent specification No. 2,115,855, a method of producing metal mesh screens is described in which a metal matrix is provided engraved with closely adjacent grooves intersected at right angles by similar grooves, the matrix being coated with a layer of metal by electro-deposition so as to fill the grooves, said coating being then lapped away from those portions of the matrix bounded by the grooves, and the matrix being finally dissolved electro-chemically or chemically in order to release the metal mesh from the grooves of the matrix. This method has proved satisfactory in practice and has enabled mesh screens of very fine pitch to be accurately produced, but in the case of mesh screens of fine pitch such as are used in television transmission tubes, considerable manipulation and care is required after the grooves of the matrix have been filled, and the amount of manipulation required is a limiting factor in the fineness of pitch which can be obtained.

The object of the present invention is to provide an improved method of producing metal mesh screens with a view to obtaining more rapid production, and also to obtaining meshes of finer pitch.

According to the present invention there is provided a method of producing a metal mesh screen wherein a matrix of thermo-plastic material is provided formed with an impression of the mesh in such manner as to develop internal stresses in said material tending to efface said impression, and metal is deposited in said impression so as to form the mesh, said energy being then caused to displace the mesh from said impression.

The term "thermo-plastic material" is used herein and in the claims in accordance with common usage to indicate materials which, as distinct from metals, are usually compounds of complex molecular structure and which become plastic in most cases at relatively low temperatures. The invention makes use of the fact that many thermo-plastic materials have a high degree of internal elasticity at temperatures below a certain limiting temperature above which the material is effectively wholly plastic and the permanence of an impression formed in the material depends upon the degree of plasticity of the material when the impression is formed, and this in the case of most materials upon the temperature of the material. The said limiting temperature may be referred to as the limiting elastic temperature and as such is referred to hereinafter and in the claims. Thus the greater the plasticity of the material when the impression is formed, the more permanent is the impression. On the other hand, if the impression is formed at a temperature below a limiting elastic temperature at which the plasticity of the material is low, the strain in the material is associated with considerable internal stress and even if the impression appears accurate in form, this stress renders the impression liable to subsequent deformation. It is in fact possible to form the impression under such conditions that the material stores a considerable amount of energy which can subsequently be released whereupon the impression is effaced and the material recovers to its original shape. This property of some thermo-plastic materials is known as elastic memory and as such it is referred to hereinafter and in the claims. For example, the strain energy can be released simply by heating the matrix and preferably in the manufacture of a metal mesh screen by the method according to the invention, said matrix is heated until the impression becomes effectively effaced and the mesh is wholly displaced therefrom and can be removed from the matrix.

The metal to form the mesh may be deposited in the impression in the matrix by providing an electrically conductive film in said impression, conveniently by sputtering or evaporating metal so as to form a film over the whole of the surface of the matrix in which the impression is formed and then removing said film from the portions of said matrix surface between the grooves of said impression, metal being thereafter deposited in the impression by electro-deposition on to said film in order to form the mesh.

Examples of thermo-plastic materials having a property of elastic memory suitable for carrying the invention into effect are polyacrylic acid derivations such as methyl methacrylate, cellulose nitrate plastics and polystyrene plastics.

In order that the said invention may be clearly understood and readily carried into effect, the same will now be more fully described with reference to the accompanying drawing, in which:

Figures 1 to 5 diagrammatically illustrate different stages in the manufacture of a metal mesh screen, in accordance with one example of the invention.

Referring to the drawing, a master plate or matrix is first prepared and this is conveniently done by ruling a plane surface on a wax layer with a system of grooves at such angles and of such pitch and dimensions as may be required for the mesh to be made. For purposes of illustration it will be assumed that it is desired to manufacture a metal mesh screen, formed by intersecting filaments which are mutually at right angles, the pitch of the screen being 600 filaments per linear inch and the filaments being approximately triangular in cross-section. The ruled surface of the wax is next rendered electrically conductive by any suitable process, for example by a process of anodic bombardment which causes a metal film to be sputtered on said surface, or by the condensation of an evaporated metal on said surface in vacuo. The wax is now transferred to an electro-deposition bath where by deposition of a relatively thick layer of metal on the conductive wax, a negative plate is produced having ridges corresponding to the grooves in the wax, and from this negative plate subsequent positive plates can be made thus permitting the originally ruled wax master to be accurately reproduced. The procedure described is therefore similar to the electrotyping process used in the manufacture of gramophone records, and with a positive metal copy of the original wax plate available, further negative plates can be made as required by electro-deposition. A fragment of such a negative plate is illustrated in section in Figure 1, said negative plate being formed by electro-deposition on the positive plate of a thin layer 2 of a hard metal such as nickel or chromium having a thickness of about .00025 inch, said layer being then backed, also by electro-deposition, with a thicker layer or base of copper 3, which may be for example about .020 inch thick.

The nickel or chromium faced negative plate is next used in a heated press as a stamper, and in the press a sheet of a suitable thermo-plastic material 4 having a property of elastic memory, methyl methacrylate in the present example, is formed with an impression of the mesh screen to be produced by being pressed against the stamper, after being softened to a suitable degree by heating to a temperature below its limiting elastic temperature, the impression comprising grooves 5 conforming in cross-section and pitch to the cross-section of the filaments of the mesh, there being of course other grooves, which are not visible in the drawing, extending at right angles to those which are shown in section in the drawing. The press employed for the stamping operation is so constructed that the temperature and pressure at which the operation is carried out can be accurately controlled, and under suitable conditions the impression formed in the thermo-plastic material can be made accurate to a high degree although considerable internal stresses are developed in the material due to its elastic memory, resulting in strain energy being stored in the material. The required temperature will of course depend upon the material used, methyl methacrylate which is relatively brittle at ordinary temperatures, being found for example to have satisfactory softness at a temperature of about 70° C., and the pressure required to form the impression will depend upon the softness of the material. After the pressing operation the sheet of thermo-plastic material is left in the press until cold.

The thickness of the sheet of thermo-plastic material is also important and should normally be several times, and at least twice the depth of the grooves to be formed in the material. In the present example the sheet is 0.05 inch and for a mesh of 600 filaments per linear inch the grooves may have a depth of about .0004 inch. In general the thickness of the sheet 4 should be such that the strain produced by the impression is substantially wholly normal to the surface on which the impression is made, so that the reactive stresses will act subtantially opposite to the direction of pressing as indicated by the arrows 6 and when subsequently the material is heated to release the energy stored in the material little or no lateral displacement of the material will occur apart from that due to its inherent thermal expansion. This is relatively small, and in consequence if there is a mesh in the grooves it will simply be lifted out as the grooves disappear. If however the sheet of thermo-plastic material is insufficiently thick the formation of the impression will be accompanied by considerable lateral spread and lateral reactive stresses will be induced on the material. The direction and magnitude of the reactive stresses under particular conditions can be investigated, if required, by constructing an enlarged model of part of the stamper and using it to mould a specimen sheet of the material, and then observing a cross-section of the impression in the specimen by means of polarised light in a conventional prismatic strain viewing device.

Figure 2:
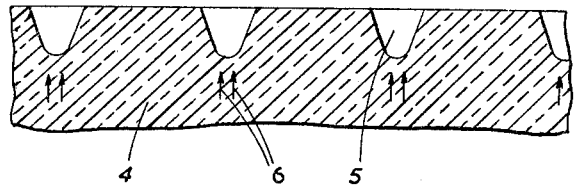
Figure 3:
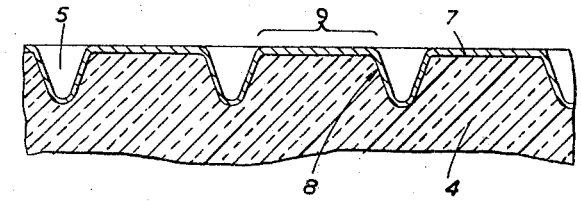
Figure 4:
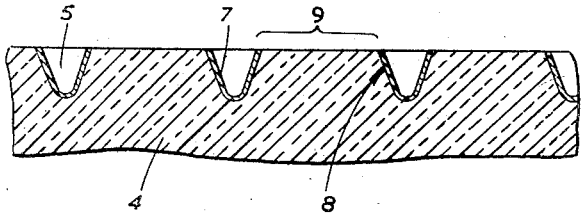

When the sheet of thermo-plastic material 4 impressed with an exact copy of the original groove system has cooled it is used as a matrix in which the mesh is formed. As shown in Figure 2 the whole of the surface 8 formed with the impression is coated with a thin film of a suitable metal 7, having a thickness of the order of a few molecules, said film rendering the surface electrically conductive, and the metal being for example, gold, silver, copper, platinum or palladium. The film is deposited for example by sputtering or evaporating the required metal on to the surface 8. The coated surface of the matrix is thereupon lightly lapped until the metal film is removed from the portions 9 of the surface lying between the grooves 5, leaving these portions clean and non-conductive as shown in Figure 3 whereas in the grooves there remains a continuous conductive film or layer of the metal 7. The matrix is now placed in an electro-deposition bath and a further metal deposit 10 is applied to the metal already in the grooves which reinforces the otherwise mechanically weak structure of the previously deposited metal film, the electro-deposition being continued until the grooves 5 are almost filled with metal as shown in Figure 4. Said further metal deposit will usually be of the same metal as the film 7 so that the metal 10 in the grooves 5, after the electro-deposition is completed, will be effectively homogeneous, as indicated in Figheating said body to soften it at a temperature below its limiting elastic temperature, pressing a mesh-shaped impression into the surface of the softened body to develop internal stresses in said body tending to efface said impression, depositing an electrically conductive film on the impressed parts of said surface, electrodepositing metal on said conductive film to form the mesh, and heating said body to release said stresses and cause said impression to be effaced, whereby the metal mesh is displaced from the body.

HERBERT EDWARD HOLMAN.

References Cited in the file of this patent

UNITED STATES PATENTS

| Number | Name | Date |
|---|---|---|
| 313,805 | Callow | Mar. 10, 1885 |
| 667,600 | Stevens | Feb. 5, 1901 |
| 1,752,371 | Daniels | Apr. 1, 1930 |
| 2,055,963 | Boss | Sept. 29, 1936 |
| 2,115,855 | Holman | May 3, 1938 |
| 2,125,776 | Ellis | Aug. 2, 1938 |
| 2,151,457 | Williams | Mar. 21, 1939 |
| 2,166,367 | Norris | July 18, 1939 |
| 2,234,994 | Vernon et al. | Mar. 18, 1941 |
| 2,252,504 | Hahn | Aug. 12, 1941 |
| 2,368,085 | Barbieri | Jan. 30, 1945 |
| 2,400,518 | Kreber et al. | May 21, 1946 |
| 2,422,325 | Wheelon | June 17, 1947 |
| 2,529,086 | Law | Nov. 7, 1950 |
| 2,548,765 | Banks et al. | Apr. 10, 1951 |

FOREIGN PATENTS

Figure 5:
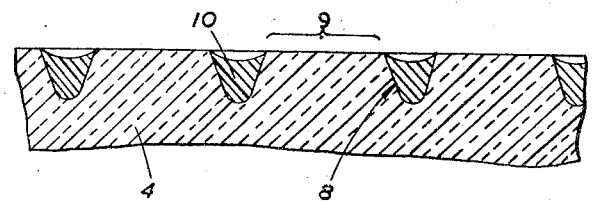

| Number | Country | Date |
|---|---|---|
| 388,444 | Great Britain | Feb. 27, 1933 | ure 4. The exposed portions 9 of surface 8 of the sheet 4, and of the deposited metal 11 may then be lightly etched if desired to remove any of the metal 10 which may have been deposited on the portions 9 of the surface 8, or to remove rough edges from the exposed surface of the deposited metal 10. The sheet 4 is then heated in order to release the strain energy which is stored in it, thereby to displace the metal mesh from the grooves, and for a sheet 4 of methyl methacrylate, heating to a temperature of about 110° C. will cause the grooves to be effaced, the now completed mesh 11 being in consequence lifted from the grooves and left resting on the surface 8 of the sheet 4 as shown in Figure 5.

The present invention contemplates the manufacture of metal mesh screens for television transmission tubes having 400 to 1500 filaments per linear inch and having a thickness of about .00025 to .001 inch. However it will be understood that the invention is not limited to metal mesh screens for use in making double sided mosaic screens for television transmission tubes, and the invention may also be applied to manufacture metal mesh screens intended for example for employment as stencil meshes, or control electrodes.

Furthermore the invention may be applied not only to metal mesh screens comprising intersecting filaments but also to metal mesh screens in the form of grids and grills and comprising adjacent filaments not intersected by other filaments.

I claim:

1. A method of producing a metal mesh screen with the aid of a body of thermoplastic material having the property of elastic memory at temperatures below a limiting elastic temperature, said method comprising the steps of heating said body to soften it at a temperature below its limiting elastic temperature, pressing a mesh-shaped impression into the surface of the softened body to develop internal stresses in said body tending to efface said impression, depositing metal in the impression to form the mesh, and heating said body to release said stresses and cause said impression to be effaced, whereby the metal mesh is displaced from the body.

2. A method of producing a metal mesh screen with the aid of a body of thermoplastic material having the property of elastic memory at temperatures below a limiting elastic temperature, said method comprising the steps of heating said body to soften it at a temperature below its limiting elastic temperature, pressing a mesh shaped impression into the surface of the softened body to develop internal stresses in said body tending to efface said impression, depositing an electrically conductive film on the impressed parts on said surface, electro-depositing metal of said conductive film to form the mesh, and heating said body to release said stresses and cause said impression to be effaced, whereby the metal mesh is displaced from the body.

3. A method of producing a metal mesh screen with the aid of a body of thermoplastic material having the property of elastic memory at temperatures below a limiting elastic temperature, said method comprising the steps of heating said body to soften it at a temperature below its limiting elastic temperature, pressing a mesh shaped impression into the surface of the softened body to develop internal stresses in said body tending to efface said impression, depositing an evaporated metal on said surface of the body to form an electrically conductive film on said surface, removing said film from parts of said surface enclosed by the mesh formations in the impression to leave said film on the impressed parts of said surface, electrically depositing metal on the conductive film to form the metal mesh, and heating said body to release said stresses and cause said impression to be effaced, whereby the metal mesh is displaced from the body.

4. A method of producing a metal mesh screen with the aid of a body of thermoplastic material having the property of elastic memory at temperatures below a limiting elastic temperature, said method comprising the steps of heating said body to soften it at a temperature below its limiting elastic temperature, pressing a mesh shaped impression into the surface of the softened body to develop internal stresses in said body tending to efface said impression, depositing metal on said surface of the body to form an electrically conductive film on said surface, removing said film from parts of said surface enclosed by the mesh formations in the impression to leave said film on the impressed parts of said surface, electrically depositing metal on the conductive film to form the metal mesh, and heating said body to release said stresses and cause said impression to be effaced, whereby the metal mesh is displaced from the body.

5. The method according to claim 2 wherein said thermoplastic material consists of cellulose nitrate.

6. The method according to claim 2 wherein said thermoplastic material consists of polystyrene.

7. The method of producing a metal mesh screen with the aid of a sheet of methyl methacrylate, said method including the steps of heating said sheet to about 70° C. to soften it, pressing a mesh-shaped impression into the surface of the heated sheet to develop internal stresses in the sheet tending to efface the impression, depositing evaporated metal to form an electrically conductive film on the impressed surface of said sheet and removing said film from areas on said surface enclosed by the mesh formations in the impression, electro-depositing further metal on the conductive film in said impression to form the mesh, and thereafter heating the sheet to about 110° C. to release the stored energy for effacing the impression and displacing the mesh from the sheet.

8. The method of producing a metal mesh screen with the aid of a sheet of methyl methacrylate, said method including the steps of heating said sheet to about 70° C. to soften it, pressing a mesh-shaped impression into the surface of the heated sheet to develop internal stresses in the sheet tending to efface the impression, sputtering an electrically conductive film onto the impressed surface of said sheet and removing said film from areas on said surface enclosed by the mesh formations in the impression, electro-depositing further metal on the conductive film in said impression to form the mesh, and thereafter heating the sheet to about 110° C. to release the stored energy for effacing the impression and displacing the mesh from the sheet.

9. A method of producing a metal mesh screen with the aid of a body of methyl methacrylate having the property of elastic memory at a temperature below a limiting elastic temperature, said method comprising the steps of